United States Patent Office 3,293,217
Patented Dec. 20, 1966

3,293,217
METHOD OF PRODUCING POLYOXYMETHYLENE
Masataka Amagasa, 15 Kamicho Komegafukuro, and Tadashi Yamaguchi, 66 Nakajimacho, both of Sendai-shi, Japan
No Drawing. Filed Mar. 12, 1963, Ser. No. 264,715
Claims priority, application Japan, Mar. 15, 1962, 37/10,232
5 Claims. (Cl. 260—67)

This invention relates to a novel method for the production of polyoxymethylene and more particularly to a novel method for the production of linear polyoxymethylene by ring opening polymerization of trioxane in liquid or gaseous sulfur dioxide.

It is known according to Audrieth and Kleinberg (Non-Aqueous Solvents P 210 (1953)) or Tokura (The Organic Reaction in Liquid Sulfur Dioxide Chem. and Chem. Ind. Japan 15, (3), p. 212 (1962)) that liquid sulfur dioxide dissolves many kinds of organic and inorganic substances and has remarkable and specific properties as solvent.

As the result of further studies on organic reactions in liquid sulfur dioxide and its applications, it has now been found that trioxane is very soluble in liquid sulfur dioxide and when the trioxane-liquid sulfur dioxide solution is left alone, there are produced precipitates of linear polyoxymethylene. According to the present invention the method comprises ring opening polymerization of trioxane in liquid or gaseous sulfur dioxide.

The polymerization may preferably be effected in the presence of initiators. Lewis acids such as $AlCl_3$, $FeCl_3$, $BF_3O(C_2H_5)_2$, $SbCl_3$, $BeCl_2$, $CdCl_2$, $ZnCl_2$, $BF_3$, $BCl_3$, $BBr_3$, $BF_3$-complex, $AlBr_3$, $GaCl_3$, $TiCl_4$, $TiBr_4$, $ZrCl_4$, $SnCl_3$, $SnCl_4$, $SnBr_4$, $SbCl_5$, $SbCl_3$, $BiCl_5$ and $BiCl_3$; $SO_3$ and chlorosulfonic acid are used as cationic initiators. Radical initiators of organic peroxides such as benzoyl peroxide, ar-substituted benzoyl peroxide, lauroyl peroxide, acetyl peroxide, ketone peroxide, cumene hydroperoxide, t-butyl hydroperoxide and di-t-butyl peroxide; sulfinic acid; aromatic sulfinic acid; 1-alkanoic acid; and $\alpha,\alpha'$-azobisisobutyronitrile may be used.

The present polymerization of trioxane is effected in liquid or gaseous sulfur dioxide. It is advantageously carried out at $-20°\sim100°$ C. for 0.1–60 hours. The temperature and period of time may be varied within wide ranges. In case of liquid sulfur dioxide, $\frac{1}{12}$–20 mol is used per mol of trioxane. The polymerization will proceed merely by permitting the system to stand. It is accelerated, however, by exposing the polymerization system to ultraviolet ray irradiation. The ultraviolet rays may preferably have wave lengths of more than 200 millimicrons.

The proportion of cationic initiator employed in the invention is 0.0001 mol to 0.1 mol based on one mol trioxane, and that of radical initiator is 0.0005 mol to 0.1 mol based on one mol trioxane.

*Example 1*

3 g. of trioxane was dissolved into 5 g. of liquid sulfur dioxide and heated at 100° C. for 6 hours. 0.95 g. of white powdery polymer was formed. To stabilize the polymer, it was subjected to acetylation in acetic anhydride-acetic acid bath (which is hereinafter referred to merely as the stabilization treatment). Intrinsic viscosity was determined using 0.5% solutions of the polymer in p-chlorophenol containing 2% $\alpha$-pinene at 60° C. The intrinsic viscosity of the polymer obtained was measured to be $[\eta]=0.308$.

*Example 2*

6 g. of trioxane and 20 mg. of $BF_3O(C_2H_5)_2$ as cationic initiator were dissolved into 10 g. of liquid sulfur dioxide and left at 0° C. for 24 hours. 4.9 g. of white powdery polymer precipitated was subjected to the same stabilization treatment as in Example 1. The intrinsic viscosity of the polymer obtained was $[\eta]=0.680$.

*Example 3*

3 g. of trioxane and 30 mg. of $SnCl_4$ as cationic catalyst were dissolved into 6 g. of liquid sulfur dioxide and left at 10° C. for 12 hours. 2.4 g. of white powdery polymer precipitated was subjected to the same stabilization treatment as in Example 1. The intrinsic viscosity of the polymer thus obtained was $[\eta]=0.508$.

*Example 4*

3.5 g. trioxane and 23 mg. of $BF_3O(C_2H_5)_2$ as cationic initiator were dissolved into 6 g. of liquid sulfur dioxide and left at $-20°$ C. for 24 hours. 1.6 g. of white powdery polymer precipitated was subjected to the same stabilization treatment as in Example 1. The intrinsic viscosity of the polymer thus obtained was $[\eta]=0.530$.

*Example 5*

4.6 g. of trioxane and 40 mg. of $AlCl_3$ as cationic initiator were dissolved into 10 g. of liquid sulfur dioxide and left at 0° C. for 24 hours. 3 g. of white powdery polymer precipitated was subjected to the same stabilization treatment as Example 1. The intrinsic viscosity of the polymer thus obtained was $[\eta]=0.421$.

*Example 6*

18 g. of trioxane and 11 mg. of $BF_3O(C_2H_5)_2$ as cationic initiator were dissolved into 12 g. of liquid sulfur dioxide and left at 0° C. for 24 hours. 10.1 g. of white powdery polymer precipitated was subjected to the same stabilization treatment as in Example 1. The intrinsic viscosity of the polymer thus obtained was $[\eta]=1.01$.

*Example 7*

3.0 g. of trioxane and 50 mg. of $\alpha,\alpha'$-azobisisobutyronitrile were dissolved into 5 g. of liquid sulfur dioxide and left at 70° C. for 6 hours. 0.3 g. of white powdery polymer precipitated was subjected to the same stabilization treatment as in Example 1. The intrinsic viscosity of the polymer thus obtained was $[\eta]=0.190$.

*Example 8*

3.0 g. of trioxane and 50 mg. of benzoyl peroxide were dissolved into 5 g. of liquid sulfur dioxide and left at 100° C. for 6 hours. 2 g. of white powdery polymer precipitated was subjected to the same stabilization treatment as in Example 1. The intrinsic viscosity of the polymer thus obtained was $[\eta]=0.291$.

*Example 9*

3.0 g. of trioxane was dissolved in 6 g. of liquid sulfur dioxide and irradiated with ultraviolet ray at 20° C. for 6 hours. 1.7 g. of white powdery polymer precipitated was subjected to the same treatment as in Example 1. The intrinsic viscosity of the polymer thus obtained was $[\eta]=0.207$.

*Example 10*

3 g. of trioxane and 10 mg. of $\alpha,\alpha'$-azobisisobutyronitrile were dissolved into 6 g. of liquid sulfur dioxide and irradiated with ultraviolet ray at 20° C. for 6 hours. 2.1 g. of white powdery polymer precipitated was subjected to the same stabilization treatment as in Example 1. The intrinsic viscosity of the polymer thus obtained was $[\eta]=0.251$.

*Example 11*

Under a reduced pressure 10 g. of trioxane in the presence of gaseous sulfur dioxide were left at 15° C. for 40 hours. 1.0 g. of white powdery polymer formed was subjected to the same treatment as in Example 1. The intrinsic viscosity of the polymer thus obtained was [η]=1.04.

*Example 12*

10 g. of trioxane and 20 mg. of $AlCl_3$ were dissolved into 10 g. of liquid sulfur dioxide, and immediately after sulfur dioxide was removed therefrom, the mixture remaining was left at 0° C. for 40 hours. 1.1 g. of white powdery polymer formed was subjected to the same stabilization treatment as in Example 1. The intrinsic viscosity of the polymer thus obtained was [η]=0.051.

*Example 13*

38 g. of trioxane and 100 mg. of $BF_3 \cdot O(C_2H_5)_2$ were dissolved into 20 g. of liquid sulfur dioxide, and immediately after sulfur dioxide was removed therefrom, the mixture remaining was left at 20° C. for 6 hours. 37 g. of white powdery polymer formed was subjected to the same stabilization treatment as in Example 1. The intrinsic viscosity of the polymer thus obtained was [η]=1.431.

*Example 14*

83 g. of trioxane and 200 mg. of $BF_3 \cdot O(C_2H_5)_2$ were dissolved into 40 g. of liquid sulfur dioxide, and immediately after sulfur dioxide was removed therefrom, the mixture remaining was left at 30° C. for 4 hours. 80 g. of white powdery polymer formed was subjected to the same stabilization treatment as in Example 1. The intrinsic viscosity of the polymer thus obtained was [η]=1.294.

*Example 15*

10 g. of trioxane and 25 mg. of $SbCl_3$ were dissolved into 5 g. of liquid sulfur dioxide, and immediately after sulfur dioxide removed therefrom, the mixture remaining was left at 10° C. for 10 hours. 5.3 g. of white powdery polymer formed was subjected to the same stabilization treatment as in Example 1. The intrinsic viscosity of the polymer thus obtained was [η]=1.051.

*Example 16*

200 g. of trioxane and 120 mg. of $BF_3 \cdot O(C_2H_5)_2$ were dissolved into 80 g. of liquid sulfur dioxide, and immediately after sulfur dioxide was removed therefrom, the mixture remaining was left at 45° C. for 6 hours. 168 g. of white powdery polymer formed was subjected to the same stabilization treatment as in Example 1. The intrinsic viscosity of the polymer thus obtained was [η]=1.521.

What is claimed is:

1. A method of producing polyoxymethylenes by means of the polymerization of trioxane, which is characterized in that the polymerization is effected in the presence of 1/12 to 20 moles of fluid sulfur dioxide per mole of trioxane at a temperature of −20° to 100° C.

2. A method of producing polyoxymethylenes by the polymerization of trioxane characterized by the fact that the polymerization is effected in the presence of gaseous sulfur dioxide under reduced pressure at −20° to 100° C.

3. A method of producing polyoxymethylenes by polymerization of trioxane wherein the polymerization is effected in the presence of 1/12 to 20 moles of liquid sulfur dioxide per mole of trioxane at a temperature of −20° to 100° C. for a period of time from 0.1 to 60 hours.

4. A method according to claim 3 wherein the polymerization is conducted in the presence of ultraviolet ray irradiation.

5. A method of producing polyoxymethylenes by polymerization of trioxane wherein the polymerization is effected in the presence of 1/12 to 20 moles of fluid sulfur dioxide per mole of trioxane at a temperature of −20° to 100° C. in the absence of an additional initiator for the polymerization.

References Cited by the Examiner

UNITED STATES PATENTS

| | | | |
|---|---|---|---|
| 2,722,520 | 11/1955 | Hulse | 260—2 |
| 2,795,571 | 6/1957 | Schneider | 260—67 |
| 2,909,492 | 10/1959 | Schilling | 260—2 |
| 2,915,560 | 12/1959 | Steinhardt et al. | 260—67 |
| 2,985,623 | 5/1961 | Schweitzer et al. | 260—67 |
| 2,989,508 | 6/1961 | Hudgin et al. | 260—67 |
| 3,027,352 | 3/1962 | Walling et al. | 260—67 |
| 3,093,560 | 6/1963 | Fourcade | 204—154 |
| 3,107,208 | 10/1963 | Chachaty | 204—154 |
| 3,219,631 | 11/1965 | Kullmar et al. | 260—67 |

FOREIGN PATENTS 939,498  10/1963  Great Britain.

OTHER REFERENCES

Okamura et al.: Isotopes and Radiation, vol. 3, No. 5, 1960, pp. 416–417.

Hayashi et al.: Die Makromolekulare Chemie, 47, No. 2/3, July 1961, pp. 230–236.

SAMUEL H. BLECH, *Primary Examiner.*

WILLIAM H. SHORT, *Examiner.*

L. M. MILLER, *Assistant Examiner.*